United States Patent
Haneda

(10) Patent No.: US 11,254,218 B2
(45) Date of Patent: *Feb. 22, 2022

(54) CHARGING SYSTEM OF MOVABLE BODIES HAVING AUTOMATIC OPERATION FUNCTION AND PROGRAM

(71) Applicant: HONDA MOTOR CO., LTD., Tokyo (JP)

(72) Inventor: Satoshi Haneda, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 361 days.

This patent is subject to a terminal disclaimer.

(21) Appl. No.: 16/423,132

(22) Filed: May 27, 2019

(65) Prior Publication Data

US 2019/0275898 A1 Sep. 12, 2019

Related U.S. Application Data

(63) Continuation of application No. PCT/JP2017/040958, filed on Nov. 14, 2017.

(30) Foreign Application Priority Data

Nov. 25, 2016 (JP) .............................. JP2016-229478

(51) Int. Cl.
*B60L 15/20* (2006.01)
*B60L 53/00* (2019.01)
(Continued)

(52) U.S. Cl.
CPC .............. *B60L 15/20* (2013.01); *B60L 53/00* (2019.02); *B60L 53/50* (2019.02); *B60L 53/65* (2019.02);
(Continued)

(58) Field of Classification Search
CPC .......... B60L 15/20; B60L 53/65; B60L 53/50; B60L 53/00; B60L 2260/20; G08G 1/065;
(Continued)

(56) References Cited

U.S. PATENT DOCUMENTS 7,783,530 B2 * 8/2010 Slemmer ................ G08G 1/146 705/28
10,522,037 B1 * 12/2019 Batra ..................... G08G 1/149
(Continued)

FOREIGN PATENT DOCUMENTS

JP H0312800 A 1/1991
JP 2000092622 A 3/2000
(Continued)

OTHER PUBLICATIONS

International Search Report and (ISA/237) Written Opinion of the International Search Authority for International Patent Application No. PCT/JP2017/040958, issued/mailed by the Japan Patent Office dated Jun. 6, 2018.
(Continued)

*Primary Examiner* — Dale W Hilgendorf

(57) ABSTRACT

A charging system, wherein a movable body has an automatic operation function, the charging system comprises: a movable body managing unit that manages a charging state of the storage battery of the movable body; and a waiting space managing unit that manages a usage state of a plurality of waiting spaces for keeping the movable body waiting, the waiting space managing unit has: a waiting space determining unit that determines, among the plurality of waiting spaces that the waiting space managing unit is managing, a waiting space for keeping the movable body waiting after charging of the movable body has completed, if the movable body managing unit has detected that: (i) charging of the movable body is being started; (ii) charging of the movable body has been started; (iii) charging of the movable body is completing; or (iv) charging of the movable body has completed.

12 Claims, 9 Drawing Sheets

(51) Int. Cl.

| | |
|---|---|
| *B60W 30/06* | (2006.01) |
| *B62D 15/02* | (2006.01) |
| *E04H 6/42* | (2006.01) |
| *G06Q 10/06* | (2012.01) |
| *G06Q 50/10* | (2012.01) |
| *G08G 1/14* | (2006.01) |
| *B60L 53/50* | (2019.01) |
| *B60L 53/65* | (2019.01) |
| *G08G 1/065* | (2006.01) |

(52) U.S. Cl.
CPC .......... *B60W 30/06* (2013.01); *B62D 15/027* (2013.01); *E04H 6/424* (2013.01); *G06Q 10/06* (2013.01); *G06Q 50/10* (2013.01); *G08G 1/065* (2013.01); *G08G 1/146* (2013.01); *G08G 1/148* (2013.01); *B60L 2260/20* (2013.01); *G05B 2219/31004* (2013.01); *G08G 1/149* (2013.01); *Y02T 90/14* (2013.01)

(58) Field of Classification Search
CPC ........ G08G 1/146; G08G 1/148; G08G 1/149; B60W 30/06; B62D 15/027; E04H 6/424; G06Q 10/06; G06Q 50/10; Y02T 90/14; G05B 2219/31004
See application file for complete search history.

(56) References Cited

U.S. PATENT DOCUMENTS

| | | | | |
|---|---|---|---|---|
| 10,825,342 | B2* | 11/2020 | Haneda | G08G 1/146 |
| 2011/0127944 | A1* | 6/2011 | Saito | B60L 53/63 |
| | | | | 320/101 |
| 2011/0131083 | A1* | 6/2011 | Redmann et al. | B60L 53/65 |
| | | | | 705/13 |
| 2013/0076296 | A1* | 3/2013 | Ushiroda | B60L 53/65 |
| | | | | 320/101 |
| 2013/0179383 | A1* | 7/2013 | Pringle | G06N 5/02 |
| | | | | 706/46 |
| 2016/0180712 | A1* | 6/2016 | Rosen et al. | G08G 1/146 |
| | | | | 705/5 |
| 2016/0246303 | A1* | 8/2016 | Chinomi | B60L 58/10 |
| 2018/0047289 | A1* | 2/2018 | Quast | G08G 1/146 |

FOREIGN PATENT DOCUMENTS

| | | | |
|---|---|---|---|
| JP | 2007219738 A | | 8/2007 |
| JP | 2010242440 A | | 10/2010 |
| JP | 2011089310 A | | 5/2011 |
| JP | 2011097685 A | | 5/2011 |
| JP | 2011103721 A | | 5/2011 |
| JP | 2011162967 A | | 8/2011 |
| JP | 2015050877 A | * | 3/2015 |
| JP | 2015050877 A | | 3/2015 |
| JP | 2015072650 A | | 4/2015 |
| JP | 2015153145 A | | 8/2015 |
| JP | 2015219811 A | | 12/2015 |

OTHER PUBLICATIONS

Ferreira Michel et al: "Self-automated parking lots for autonomous vehicles based on vehicular ad hoc networking", 2014 IEEE Intelligent Vehicles Symposium Proceedings, IEEE, Jun. 8, 2014 (Jun. 8, 2014), pp. 472-479,DOI: 10.1109/IVS.2014.6856561(see ResearchGate pp. 1-8).
Office Action issued for counterpart Japanese Application No. 2016-229478, issued by the Japan Patent Office dated Jun. 27, 2017 (drafted on Jun. 22, 2017).

* cited by examiner

CHARGING SYSTEM OF MOVABLE BODIES HAVING AUTOMATIC OPERATION FUNCTION AND PROGRAM

CROSS REFERENCE TO RELATED APPLICATION

This is a continuation application of International Application No. PCT/JP2017/040958, filed on Nov. 14, 2017, which claims priority to Japanese Patent Application No. 2016-229478, filed on Nov. 25, 2016, the contents of each of which are incorporated herein by reference.

BACKGROUND

1. Technical Field

The present invention relates to a charging system and a program.

2. Related Art

A mechanical parking apparatus that moves a pallet together with an electric automobile being mounted thereon to another parking space after completion of charging of the electric automobile is known (please see, for example, Patent Documents 1 to 4).
[Patent Document 1] Japanese Patent Application Publication No. 2011-089310
[Patent Document 2] Japanese Patent Application Publication No. 2011-097685
[Patent Document 3] Japanese Patent Application Publication No. 2011-103721
[Patent Document 4] Japanese Patent Application Publication No. 2011-254593

SUMMARY

It is desired to improve the use efficiency of charging stations to charge electric automobiles.

A first aspect of the present invention provides a charging system. The above-mentioned charging system for example charges a storage battery mounted on a movable body by supplying electric power thereto, the movable body being movable using electric power provided from the storage battery. The movable body may have an automatic operation function. The above-mentioned charging system may include a movable body managing unit that manages a charging state of the storage battery of the movable body. The above-mentioned charging system may include a waiting space managing unit that manages a usage state of a plurality of waiting spaces for keeping the movable body waiting. In the above-mentioned charging system, the waiting space managing unit may have a waiting space determining unit that determines, among the plurality of waiting spaces that the waiting space managing unit is managing, a waiting space for keeping the movable body waiting after charging of the movable body has completed, if the movable body managing unit has detected that: (i) charging of the movable body is being started; (ii) charging of the movable body has been started; (iii) charging of the movable body is completing; or (iv) charging of the movable body has completed. The waiting space managing unit may have a waiting instruction transmitting unit that transmits, to the movable body that has completed charging, a waiting instruction to move the movable body from a charging position to the waiting space determined by the waiting space determining unit.

A second aspect of the present invention provides a program. The above-mentioned program may be a program for causing a computer to function as the above-mentioned charging system. A non-transitory computer-readable medium having stored thereon the above-mentioned program may be provided.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention. In the figures, identical or similar portions are provided with identical reference numbers, and the same explanation is not repeated in some cases.

Figure 1:
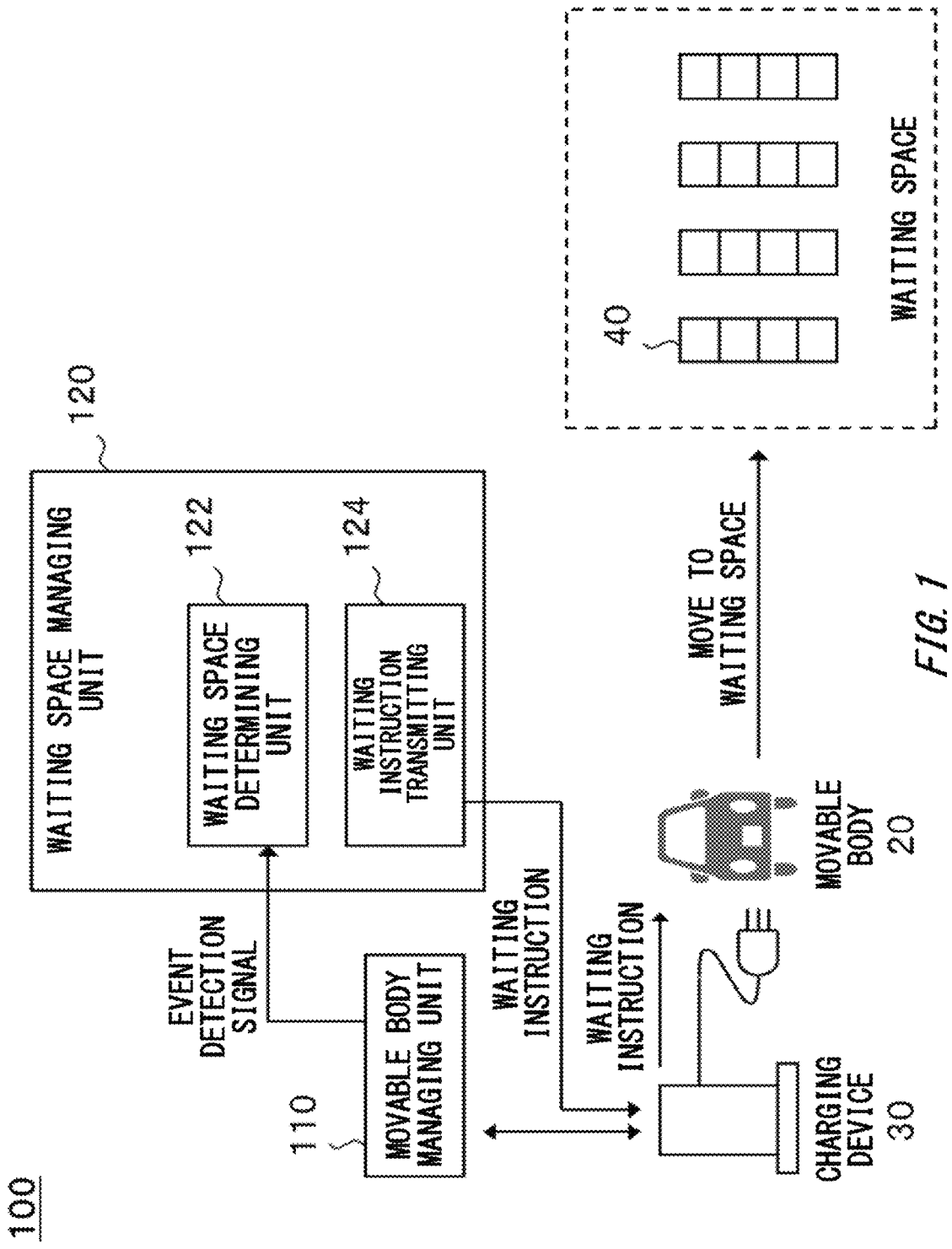
FIG. 1 schematically shows one example of the system configuration of a charging system 100.

[Outline of Charging System 100] FIG. 1 schematically shows one example of the system configuration of a charging system 100. In the present embodiment, the charging system 100 supplies electric power to a movable body 20. The charging system 100 for example uses a charging device 30 to charge a storage battery of the movable body 20 electrically coupled with the charging device 30.

In the present specification, the phrase "electrically coupled" refers to states not limited to one in which electrical energy is transmitted in a contact manner. The phrase "electrically coupled" refers to a concept also including a state where electrical energy is transmitted in a contactless manner, and a state where electrical energy is transmitted in a manner combining a contact manner and a contactless manner. Also, the phrase "electrically coupled" refers to states not limited to one in which electrical energy is transmitted between two elements, with no other elements interposed therebetween. The phrase "electrically coupled" refers to a concept also including a state where electrical energy is transmitted between two elements through another element.

In the present embodiment, the movable body 20 may be a movable body that has a storage battery mounted thereon, and is movable using electric power provided from the storage battery. The movable body 20 may have an automatic operation function. Thereby, the movable body 20 can move by remote manipulation by a user, or automatic operation by a computer mounted thereon (which may be referred to as autocruising, cruise control, or the like in some cases.).

Examples of the movable bodies may include automobile, autobicycle, marine vessel, flight vehicle and the like. Examples of the automobile may include an engined vehicle, an electric automobile, a fuel cell vehicle, a hybrid vehicle, a movable work machine and the like. The moving mode of the work machine may be an automatic mode or manual mode. Examples of the work machine may include lawn mower, grass mower, power tiller, tractor, hauling equipment, pump, atomizer, cleaning machine, snow blower and the like.

Examples of the autobicycles may include (i) a motorcycle, (ii) a trimotorcycle, (iii) a standing-ride bicycle having a power unit such as Segway (registered trademark), Kickboard (registered trademark) with a power unit, a skate board with a power unit, and the like. The power units may be (i) an internal combustion engine such as an engine or a prime mover or (ii) a combination of an electric power storage device or electric power generating device and an electric motor. Examples of the marine vessels may include a ship, a hovercraft, a water scooter, a submarine, a submersible vessel, an underwater scooter and the like. Examples of the flight vehicles may include an airplane, an airship or balloon, an air balloon, a helicopter, a drone and the like.

In the present embodiment, the charging system 100 includes a movable body managing unit 110 and a waiting space managing unit 120. The movable body managing unit 110 manages the charging state of a storage battery of the movable body 20. The waiting space managing unit 120 manages the usage state of a plurality of waiting spaces 40 for keeping the movable body 20 waiting. The waiting space managing unit 120 has a waiting space determining unit 122 and a waiting instruction transmitting unit 124.

In the present embodiment, if the movable body managing unit 110 detected that: (i) charging of the movable body 20 is being started; (ii) charging of the movable body 20 has been started; (iii) charging of the movable body 20 is completing; or (iv) charging of the movable body 20 has completed, the waiting space determining unit 122 determines, among the plurality of waiting spaces 40 that the waiting space managing unit 120 is managing, a waiting space 40 for keeping the movable body 20 waiting after charging of the movable body 20 has completed. For example, in response to the movable body managing unit 110 receiving an event detection signal indicating that a particular event related to charging has occurred, the waiting space determining unit 122 determines a waiting space 40 for keeping the movable body 20 waiting.

In the present embodiment, the waiting instruction transmitting unit 124 transmits, to the movable body 20 that has completed charging, a waiting instruction to move the movable body 20 from a charging position to the waiting space 40 determined by the waiting space determining unit 122. A transmission path of the waiting instruction is not particularly limited. In one embodiment, the waiting instruction is transmitted to the movable body 20 through a communication network and at least one of the movable body managing unit 110, the charging device 30 and a communication terminal of a user of the movable body 20. In another embodiment, the waiting instruction is transmitted directly to the movable body 20 through a communication network. Upon receiving the waiting instruction, the movable body 20 moves by automatic operation to the waiting space 40 indicated by the waiting instruction.

[Specific Configuration of Each Unit of Charging System 100] Each unit of the charging system 100 may be realized by hardware, realized by software, or realized by hardware and software. Each unit of the charging system 100 may be, at least partially, realized by a single server or realized by a plurality of servers. Each unit of the charging system 100 may be, at least partially, realized on a virtual server or cloud system. Each unit of the charging system 100 may be, at least partially, realized by a personal computer or mobile terminal. Examples of the mobile terminal may include a mobile phone, a smartphone, a PDA, a tablet, a notebook computer or laptop computer, a wearable computer and the like. The charging system 100 may use a distributed ledger technology or distributed network such as a blockchain to store information.

If at least part of components constituting the charging system 100 is realized by software, the components realized by the software may be realized by activating, in an information processing device having a general configuration, the software or a program specifying operations about the components. The above-mentioned information processing device may include: (i) a data processing device having a processor such as a CPU or a GPU, a ROM, a RAM, a communication interface and the like; (ii) an input device such as a keyboard, a touch panel, a camera, a microphone, various types of sensor or a GPS receiver; (iii) an output device such as a display device, a speaker or a vibration device; and (iv) a storage device such as a memory or a HDD (including an external storage device). In the above-mentioned information processing device, the above-mentioned data processing device or storage device may store the above-mentioned software or program. By being executed by a processor, the above-mentioned software or program causes the above-mentioned information processing device to execute the operations specified by the software or program. The above-mentioned software or program may be stored on a non-transitory computer-readable recording medium.

According to the present embodiment, the movable body 20 that has completed charging can be automatically moved from a charging position to another space. Thereby, a user of the movable body 20 is not required to stay at the charging position while the movable body 20 is being charged, and can use time required to charge the movable body 20 effectively. Also, a drawback that the charging device 30 cannot be used after completion of charging of the movable body 20 and until a user of the movable body 20 moves the movable body 20 can be solved, without introducing large-scale mechanical parking equipment. As a result, the use efficiency of the charging device 30 can be enhanced readily.

Figure 2:
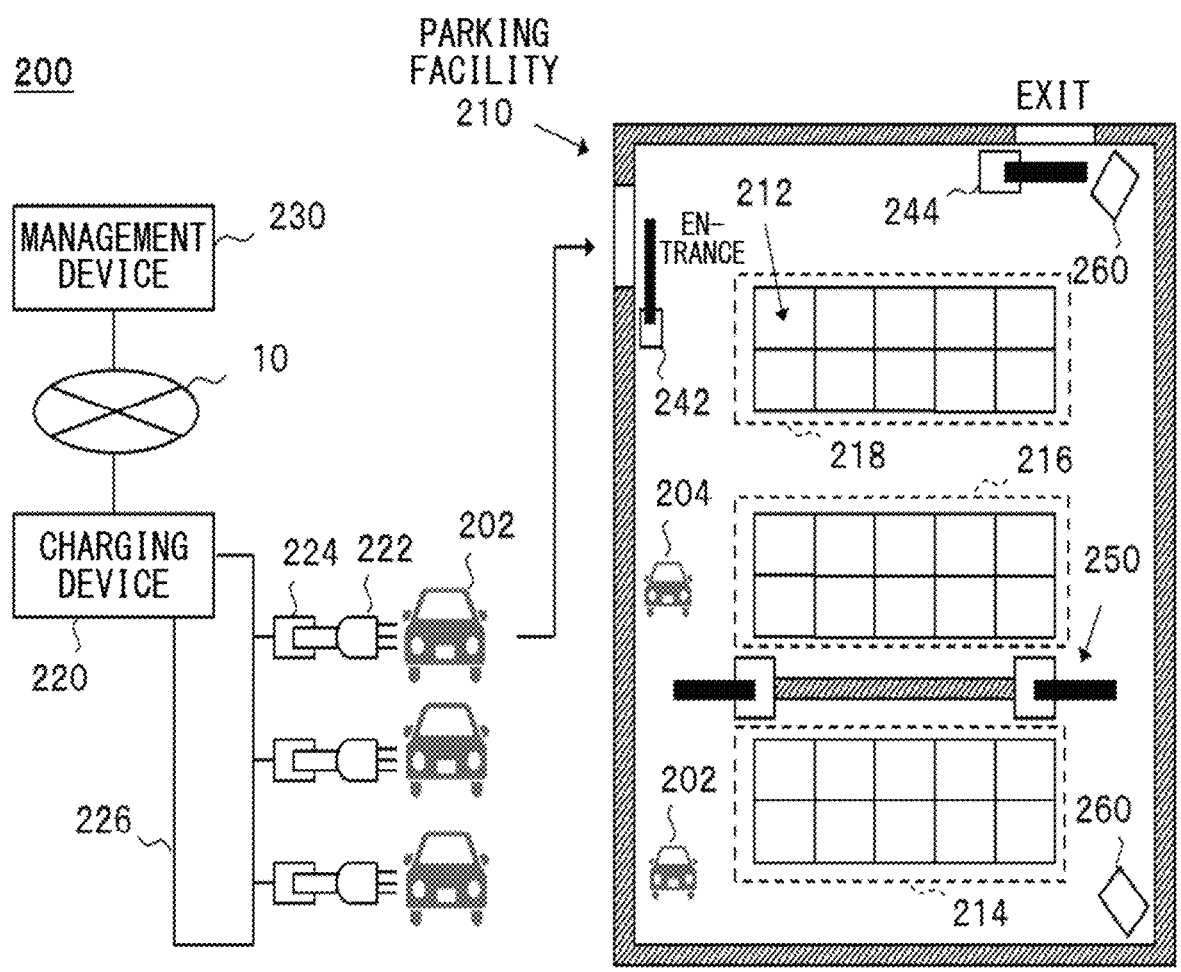
FIG. 2 schematically shows one example of the system configuration of a parking facility managing system 200.

[Outline of Parking Facility Managing System 200] FIG. 2 schematically shows one example of the system configuration of a parking facility managing system 200. In the present embodiment, the parking facility managing system 200 manages a parking facility 210. In the present embodiment, a plurality of parking spaces 212 are disposed in the parking facility 210. In the present embodiment, the parking facility 210 includes an entrance managing unit 242, an exit managing unit 244, a movable fence 250 and a monitoring camera 260 that monitors spaces around or inside the parking facility 210.

The entrance managing unit 242 manages entrance of vehicles into the parking facility 210. For example, the entrance managing unit 242 counts the number of vehicles having entered the parking facility 210. The entrance managing unit 242 may communicate with a vehicle wishing to enter the parking facility 210, and if the vehicle satisfies a particular condition, allow entrance of the vehicle. On the other hand, if the vehicle does not satisfy a particular condition, it may prohibit entrance of the vehicle. The entrance managing unit 242 may communicate with a vehicle wishing to enter the parking facility 210, and acquire information for managing the usage status of a parking space 212. Examples of the information for managing the usage status of the parking space 212 may include identification information of the vehicle, information indicating whether or not the vehicle has an automatic operation function, information indicating whether or not an automatic operation mode is currently set, and the like.

The exit managing unit 244 manages exit of a vehicle from the parking facility 210. For example, the exit managing unit 244 counts the number of vehicles having exited from the parking facility 210. The exit managing unit 244 may communicate with a vehicle that is exiting and acquire information for managing the usage status of the parking space 212. Examples of the information for managing the usage status of the parking space 212 may include identification information of the vehicle, information indicating whether or not the vehicle has an automatic operation function, information indicating whether or not the vehicle was in an automatic operation mode at the time of entrance, identification information of a waiting space where the vehicle was waiting, and the like.

The movable fence 250 partitions the space inside the parking facility 210 at a given position or a predetermined position. The movable fence 250 may have a movable partitioning member, a lifting and lowering-type partitioning member or a winding-type partitioning member.

In the present embodiment, the parking facility managing system 200 includes the parking facility 210, a charging device 220 and a management device 230. In the present embodiment, the charging device 220 has one or more power supply plugs 222, one or more manipulators 224 for moving each power supply plug, and a power supply cable 226 that supplies one or more power supply plugs 222 with electric power.

The parking facility managing system 200 may be one example of a charging system. The parking facility managing system 200 may be one example of a managing system. The charging device 220 may be one example of an electric power supply unit. The power supply plug 222 may be one example of a connection terminal. The manipulator 224 may be one example of a mechanism for automatically moving a connection terminal. The management device 230 may be one example of a movable body managing unit. The management device 230 may be one example of a waiting space managing unit. The entrance managing unit 242 may be one example of an entrance restricting unit. The movable fence 250 may be one example of an entrance restricting unit.

The parking facility 210 may house a vehicle 202 having an automatic operation function or may house a vehicle 204 not having an automatic operation function. The vehicle 202 may be a vehicle on which a storage battery is mounted and that can move using electric power provided from the storage battery. The vehicle 204 may have a storage battery mounted thereon or may not have a storage battery mounted thereon. The vehicle 202 may be one example of a first movable body. The vehicle 204 may be one example of a second movable body.

In the present embodiment, the charging device 220 supplies the vehicle 202 or the vehicle 204 with electric power, and charges a secondary battery of the vehicle 202 or the vehicle 204. In the present embodiment, the charging device 220 has the power supply plug 222 for supplying the vehicle 202 or the vehicle 204 with electric power in a contact manner and the manipulator 224 for automatically moving the charging device 220. However, the charging device 220 is not limited to the present embodiment. In another embodiment, the charging device 220 may have a mechanism for supplying a movable body with electric power in a contactless manner.

In the present embodiment, the management device 230 manages the parking facility 210 and the charging device 220. The management device 230 manages a plurality of the parking spaces 212, classifying them into three blocks, a block 214, a block 216 and a block 218. In one embodiment, the management device 230 manages a plurality of the parking spaces 212, classifying them into waiting spaces for vehicles 202 having automatic operation functions and waiting spaces for vehicles 204 not having an automatic operation function.

The waiting spaces for the vehicles 202 having automatic operation functions may be spaces to be used exclusively as waiting spaces for the vehicles 202 having automatic operation functions, or may be spaces to be used mainly as waiting spaces for the vehicles 202 having automatic operation functions. Likewise, the waiting spaces for the vehicles 204 not having an automatic operation function may be spaces to be used exclusively as waiting spaces for the vehicles 204 not having an automatic operation function, or may be spaces to be used mainly as waiting spaces for the vehicles 204 not having an automatic operation function.

In the example shown in FIG. 2, the management device 230 manages the block 214 as waiting spaces for the vehicles 202 having automatic operation functions, and manages the block 216 and the block 218 as waiting spaces for the vehicles 204 not having an automatic operation function. The block 214, block 216 and block 218 may be one example of a first waiting space or second waiting space.

In the present embodiment, the charging device 220 and the management device 230 can transmit and receive information via a communication network 10. The charging device 220 and the management device 230 may be located at different locations, or may be contained inside the same housing. The charging device 220 and part of the management device 230 may be contained inside the same housing.

In the present embodiment, the communication network 10 may be a wired communication transmission path, a wireless communication transmission path, or a combination of a wireless communication transmission path and a wired communication transmission path. The communication network 10 may include a wireless packet communication network, the Internet, a P2P network, a private line, a VPN, an electric power line communication line and the like. The communication network 10: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

[Specific Configuration of Each Unit of Parking Facility Managing System 200] Each unit of the parking facility managing system 200 may be realized by hardware, realized by software, or realized by hardware and software. Each unit of the parking facility managing system 200 may be, at least partially, realized by a single server or realized by a plurality of servers. Each unit of the parking facility managing system 200 may be, at least partially, realized on a virtual server or a cloud system. Each unit of the parking facility managing system 200 may be, at least partially, realized by a personal computer or a mobile terminal. Examples of the mobile terminal may include a mobile phone, a smartphone, a PDA, a tablet, a notebook computer or laptop computer, a wearable computer and the like. The parking facility managing system 200 may use a distributed ledger technology or distributed network such as a blockchain to store information.

If at least part of the components constituting the parking facility managing system 200 is realized by software, the components realized by the software may be realized by activating the software or a program specifying operations about the components in an information processing device having a general configuration. The above-mentioned information processing device may include: (i) a data processing device having a processor such as a CPU or a GPU, a ROM, a RAM, a communication interface and the like; (ii) an input device such as a keyboard, a touch panel, a camera, a microphone, various types of sensor or a GPS receiver; (iii) an output device such as a display device, a speaker or a vibration device; and (iv) a storage device such as a memory or a HDD (including an external storage device). In the above-mentioned information processing device, the above-mentioned data processing device or storage device may store the above-mentioned software or program. By being executed by a processor, the above-mentioned software or program causes the above-mentioned information processing device to execute the operations specified by the software or program. The above-mentioned software or program may be stored on a non-transitory computer-readable recording medium.

Figure 3:
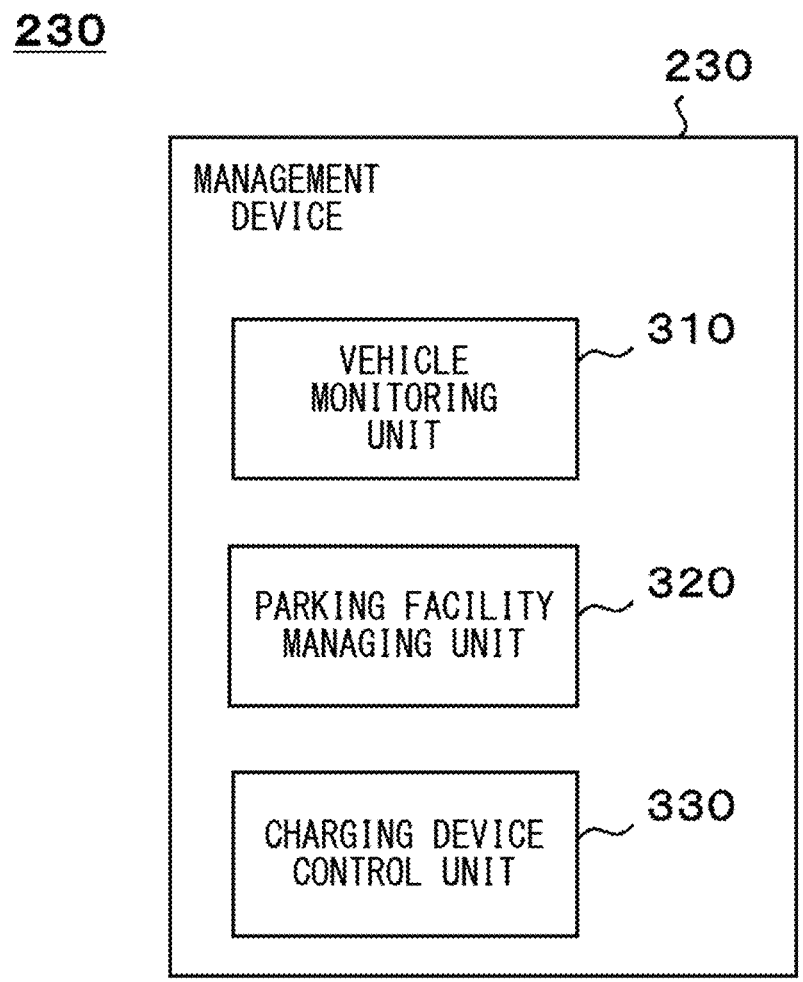
FIG. 3 schematically shows one example of the internal configuration of a management device 230.

FIG. 3 schematically shows one example of the internal configuration of the management device 230. In the present embodiment, the management device 230 includes a vehicle monitoring unit 310, a parking facility managing unit 320 and a charging device control unit 330. The vehicle monitoring unit 310 may be one example of a movable body managing unit. The parking facility managing unit 320 may be one example of a waiting space managing unit.

In the present embodiment, the vehicle monitoring unit 310 monitors a vehicle 202. The vehicle monitoring unit 310 for example manages the charging state of a storage battery of a vehicle 202. Examples of the charging state of the storage battery of the vehicle 202 may include the voltage of the storage battery, the SOC of the storage battery, the status of the charging operation and the like. Examples of the status of the charging operation may include (i) that charging is being started, (ii) that charging has been started, (iii) that charging is completing, (iv) charging has completed and the like.

The vehicle monitoring unit 310 may acquire information related to the charging state of the storage battery of the vehicle 202 from the charging device 220. The vehicle monitoring unit 310 may acquire information related to the charging state of the storage battery of the vehicle 202 from a computer of the vehicle 202. The vehicle monitoring unit 310 may monitor the current position of the vehicle 202.

In the present embodiment, the parking facility managing unit 320 manages the usage states of a plurality of parking spaces 212 for keeping vehicles 202 or vehicles 204 waiting.

The parking facility managing unit 320 for example manages the usage state of parking spaces 212 provided inside the parking facility 210. The parking facility managing unit 320 may manage the usage state of parking spaces 212 provided outside the parking facility 210. The parking facility managing unit 320 may manage equipment disposed in the parking facility 210. For example, the parking facility managing unit 320 manages at least one of the entrance managing unit 242, the exit managing unit 244, the movable fence 250 and the monitoring camera 260. The parking facility managing unit 320 may acquire information collected by each unit of equipment from at least one of the entrance managing unit 242, the exit managing unit 244, the movable fence 250 and the monitoring camera 260.

In the present embodiment, the charging device control unit 330 controls the charging device 220. For example, if the vehicle monitoring unit 310 determines to start charging of a storage battery of a vehicle 202, the charging device control unit 330 controls the charging device 220 to start supply of electric power from the charging device 220 to the vehicle 202. Also, if the vehicle monitoring unit 310 senses that charging of the storage battery of the vehicle 202 has completed, the charging device control unit 330 controls the charging device 220 to stop supply of electric power from the charging device 220 to the vehicle 202.

Figure 4:
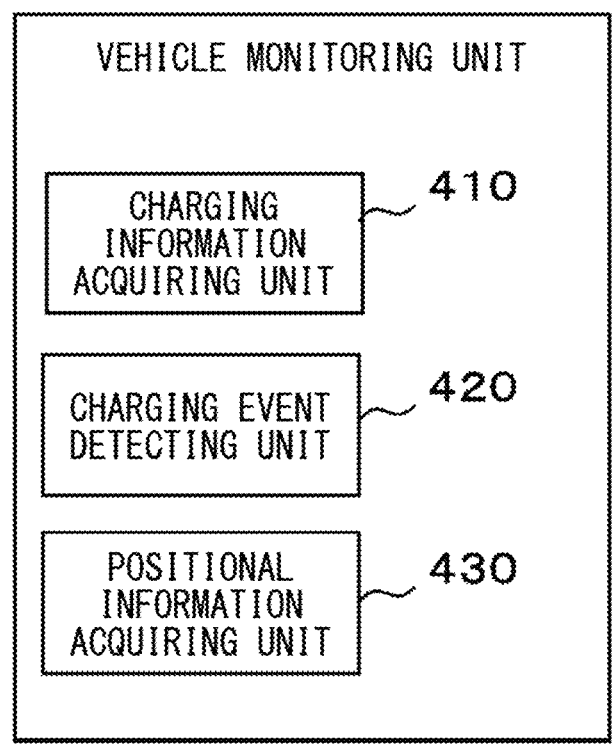
FIG. 4 schematically shows one example of the internal configuration of a vehicle monitoring unit 310.

FIG. 4 schematically shows one example of the internal configuration of the vehicle monitoring unit 310. In the present embodiment, the vehicle monitoring unit 310 includes a charging information acquiring unit 410, a charging event detecting unit 420 and a positional information acquiring unit 430.

In the present embodiment, the charging information acquiring unit 410 for example acquires information related to the charging state of a storage battery of a vehicle 202. The charging information acquiring unit 410 may acquire information related to a particular event related to charging. An acquisition route of the above-mentioned information is not particularly limited. The charging information acquiring unit 410 may acquire various types of information from the vehicle 202 and may acquire various types of information from the charging device 220. The charging information acquiring unit 410 may transmit the various types of information acquired to the charging event detecting unit 420.

In the present embodiment, the charging event detecting unit 420 for example detects that a particular event related to charging has occurred based on the information acquired by the charging information acquiring unit 410. Examples of the particular event may include (i) that charging of the vehicle 202 is being started, (ii) that charging of the vehicle 202 has been started, (iii) that charging of the vehicle 202 is completing, (iv) charging of the vehicle 202 has completed, and the like. The charging event detecting unit 420 may transmit, to the parking facility managing unit 320, a signal indicating that occurrence of the above-mentioned particular event is detected (which may be sometimes referred to as an event detection signal).

The positional information acquiring unit 430 for example acquires positional information about a vehicle 202. An acquisition route of the above-mentioned information is not particularly limited. The positional information acquiring unit 430 may for example receive, from the vehicle 202, a signal indicating that movement to a waiting space designated by the parking facility managing unit 320 has completed or a signal indicating that the vehicle 202 cannot wait in a waiting space designated by the parking facility managing unit 320. The positional information acquiring unit 430 may transmit a signal received from the vehicle 202 to the parking facility managing unit 320.

Figure 5:
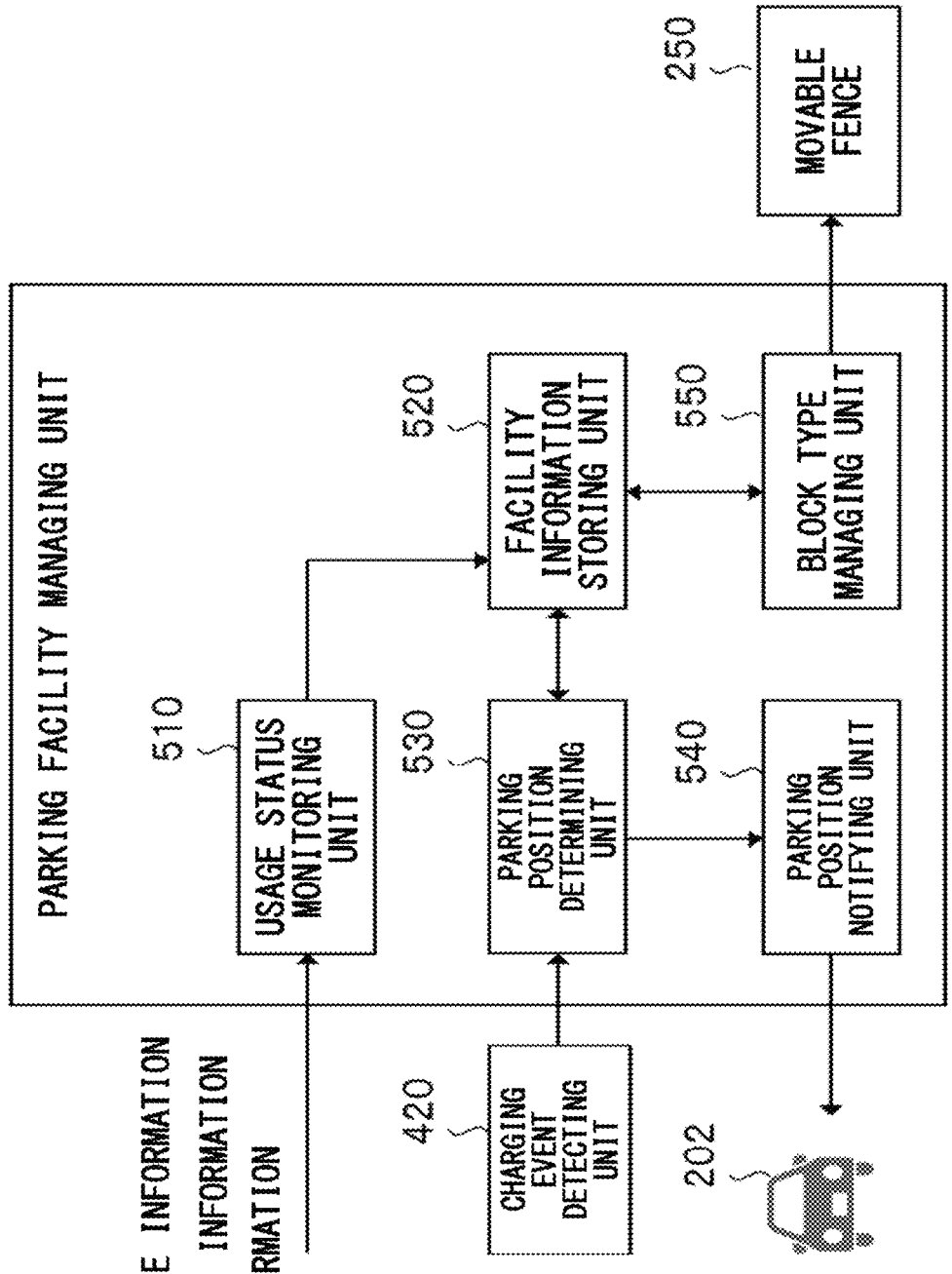
FIG. 5 schematically shows one example of the internal configuration of a parking facility managing unit 320.

FIG. 5 schematically shows one example of the internal configuration of the parking facility managing unit 320. In the present embodiment, the parking facility managing unit 320 includes a usage status monitoring unit 510, a facility information storing unit 520, a parking position determining unit 530, a parking position notifying unit 540 and a block type managing unit 550. The usage status monitoring unit 510 and the block type managing unit 550 may be one example of a waiting space managing unit. The facility information storing unit 520 may be one example of a waiting space information storing unit. The parking position determining unit 530 may be one example of a waiting space determining unit. The parking position notifying unit 540 may be one example of a waiting instruction transmitting unit.

In the present embodiment, the usage status monitoring unit 510 manages the usage status of each parking space among a plurality of parking spaces 212. For example, based on information acquired from at least one of the entrance managing unit 242, the exit managing unit 244, the movable fence 250 and the monitoring camera 260, the usage status monitoring unit 510 monitors the usage status of each parking space among the plurality of parking spaces 212.

The usage status monitoring unit 510 generates information related to the usage status for each parking space among the plurality of parking spaces 212, and stores the information in the facility information storing unit 520. Examples of the information indicating the usage status may include information indicating that a parking space is available, information indicating that a parking space is unavailable, information indicating that a parking space is being used, information indicating that a parking space is being reserved as a spare space, information indicating that abnormality is occurring and the like.

As described above, the positional information acquiring unit 430 receives, from a vehicle 202 for which a waiting position has been designated by the parking facility managing unit 320, a signal indicating that movement to the designated waiting space has completed or a signal indicating that the vehicle 202 cannot wait in the designated waiting space. The positional information acquiring unit 430 transmits the signal received from the vehicle 202 to the parking facility managing unit 320. At this time, the usage status monitoring unit 510 may reserve a spare waiting space for the above-mentioned vehicle 202 until the positional information acquiring unit 430 receives any of the above-mentioned signals from the vehicle 202. The usage status monitoring unit 510 may reserve at least one spare waiting space for a plurality of vehicles 202.

In the present embodiment, the usage status monitoring unit 510 manages a plurality of parking spaces 212, classifying them into first waiting spaces for vehicles 202 having automatic operation functions and second waiting spaces for vehicles 204 not having an automatic operation function. The usage status monitoring unit 510 may determine whether to manage each block as a first waiting space or as a second waiting space. For example, the block type managing unit 550 determines whether each block among a plurality of blocks (which are for example the block 214, the block 216 and the block 218) is a block for first waiting spaces or a block for second waiting spaces. The usage status monitoring unit 510 may manage, as a first waiting space, a parking space 212 included in the block for first waiting spaces. The usage status monitoring unit 510 may manage, as a second waiting space, a parking space 212 included in the block for second waiting spaces.

In the present embodiment, the facility information storing unit 520 stores information related to equipment of the parking facility 210. For example, the facility information storing unit 520 stores information indicating the usage state of each waiting space among the plurality of waiting spaces. For each parking space among the plurality of parking spaces 212, the facility information storing unit 520 may store, in association with each other, positional information about the waiting space and information related to a period during which the waiting space can be used. The facility information storing unit 520 may store information acquired from at least one of the entrance managing unit 242, the exit managing unit 244, the movable fence 250 and the monitoring camera 260.

In the present embodiment, if the charging event detecting unit 420 detects occurrence of a particular event, the parking position determining unit 530 determines a parking space 212 for keeping a vehicle 202 waiting after completion of charging of the vehicle 202 among a plurality of parking spaces 212 that are managed by the parking facility managing unit 320. For example, the parking position determining unit 530 extracts a parking space 212 for keeping the vehicle 202 waiting after completion of charging of the vehicle 202 among a plurality of parking spaces 212 stored in the facility information storing unit 520. Examples of the above-mentioned particular event may include (i) that charging of the vehicle 202 is being started, (ii) that charging of the vehicle 202 has been started, (iii) that charging of the vehicle 202 is completing, (iv) charging of the vehicle 202 has completed and the like.

In the present embodiment, the parking position notifying unit 540 transmits, to a vehicle 202 that has completed charging, an instruction for moving the above-mentioned vehicle 202 from a position at which the charging has been performed to a parking space 212 determined by the parking position determining unit 530. A transmission route of the above-mentioned instruction is not particularly limited. In one embodiment, the above-mentioned instruction is transmitted to the vehicle 202 via the communication network 10 and at least one of the charging device 220 and a communication terminal of a user of the vehicle 202. In another embodiment, the above-mentioned instruction is directly transmitted to the vehicle 202 via the communication network 10. The above-mentioned instruction may be one example of a waiting instruction.

The above-mentioned instruction may include positional information about the parking space 212 determined by the parking position determining unit 530. The above-mentioned instruction may be (i) an instruction to stop a vehicle 202 at a particular position after moving the vehicle 202 to the position, (ii) an instruction to stop the vehicle 202 in a particular area after moving the vehicle 202 to a given position in the area, or (iii) an instruction to cause the vehicle 202 to cruise in a particular area after moving the vehicle 202 to a given position in the area.

The block type managing unit 550 manages the types of the block 214, the block 216 and the block 218. Examples of the types of the blocks may include the above-mentioned block for first waiting spaces, the above-mentioned block for second waiting spaces and the like.

Figure 6:
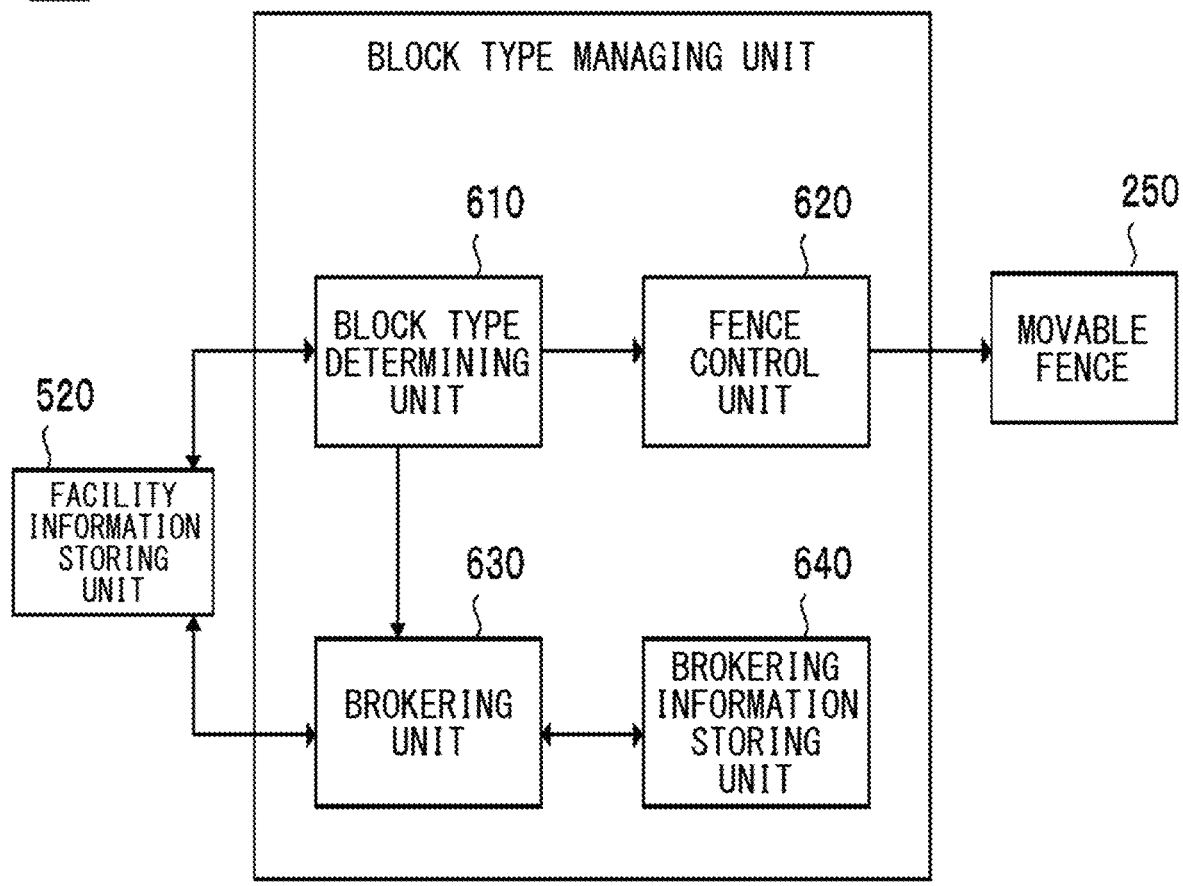
FIG. 6 schematically shows one example of the internal configuration of a block type managing unit 550.

FIG. 6 schematically shows one example of the internal configuration of the block type managing unit 550. In the present embodiment, the block type managing unit 550 includes a block type determining unit 610, a fence control unit 620, a brokering unit 630 and a brokering information storing unit 640. The block type determining unit 610 may be one example of a boundary determining unit. The fence control unit 620 may be one example of a boundary position transmitting unit, a gate position determining unit and a gate position transmitting unit.

In the present embodiment, the block type determining unit 610 determines the type of each block among the plurality of blocks. For example, the block type determining unit 610 determines whether each block among a plurality of blocks is a block for first waiting spaces or a block for second waiting spaces. For example, the block type determining unit 610 refers to information stored in the facility information storing unit 520, and manages the usage status of first waiting spaces and the usage status of second waiting spaces. The block type determining unit 610 may determine to change the area of at least one of first waiting spaces and second waiting spaces according to at least one of the usage status of the first waiting spaces and the usage status of the second waiting spaces. The block type determining unit 610 may determine whether each block among a plurality of blocks is the block for first waiting spaces or the block for second waiting spaces based on the usage status of the first waiting spaces and the usage status of the second waiting spaces. Thereby, a boundary between first waiting spaces and second waiting spaces can be determined.

For example, if a parking space 212 that can be used as a first waiting space is smaller than a predetermined value, the block type determining unit 610 extracts a block to use as a block for first waiting spaces from one or more blocks being used as a block for second waiting spaces. The block type determining unit 610 may extract a block to use as a block for first waiting spaces so that installation of the movable fence 250 becomes easy. The block type determining unit 610 may extract a block to use as a block for first waiting spaces so that the length of the fence is minimized. The block type determining unit 610 may extract a block to use as a block for first waiting spaces so that the number of turns of the fence is minimized.

The sum of the area of first waiting spaces and the area of second waiting spaces may be constant or may not be constant. If the sum of the area of first waiting spaces and the area of second waiting spaces is constant, the areas of the first waiting spaces and the second waiting spaces can be changed for example by changing the installation position of the movable fence 250. If the sum of the area of first waiting spaces and the area of second waiting spaces is constant, and if the parking facility 210 has a plurality of areas that are partitioned by a fixed type gate, the areas of the first waiting spaces and the second waiting spaces may be changed by changing the type of each area. If the sum of the area of first waiting spaces and the area of second waiting spaces is not constant, the area of at least one of the first waiting spaces and the second waiting spaces can be changed for example by handling a waiting space outside the parking facility 210 temporarily as a first waiting space or second waiting space.

In the present embodiment, the fence control unit 620 controls the movable fence 250. A control signal to control the movable fence 250 may be transmitted to the movable fence 250. In one embodiment, the fence control unit 620 determines the installation position of the movable fence 250. For example, the fence control unit 620 determines the installation position of the movable fence 250 for partitioning the block for vehicles 202 and the block for vehicles 204 based on the block types determined by the block type determining unit 610. The fence control unit 620 transmits, to the movable fence 250, a signal instructing installation of the fence and a signal indicating the installation position of the fence. Thereby, the positional information about the boundary between first waiting spaces and second waiting spaces can be transmitted to the movable fence 250.

In the present embodiment explained, the fence control unit 620 controls the movable fence 250 to change the areas of first waiting spaces and second waiting spaces. However, the parking facility managing system 200 is not limited to the present embodiment. In another embodiment, the fence control unit 620 may control the entrance managing unit 242 to restrict entrance of vehicles into the parking facility 210, thereby changing the areas of first waiting spaces and second waiting spaces.

For example, the entrance managing unit 242 has a gate for restricting entrance of vehicles. The fence control unit 620 may control the entrance managing unit 242 by transmitting, to the entrance managing unit 242, a condition for the entrance managing unit 242 to decide whether or not to allow entrance of vehicles. In this case, the entrance managing unit 242 performs communication with a vehicle wishing to enter the parking facility 210, and for example decides whether or not the vehicle is set to an automatic operation mode. If the above-mentioned vehicle is set to an automatic operation mode, the vehicle is allowed to enter the parking facility 210. On the other hand, if the above-mentioned vehicle is not set to an automatic operation mode, the vehicle is prohibited from entering the parking facility 210. Thereby, blocks included in the parking facility 210 can be changed into a block for first waiting spaces along with the lapse of time. As a result, the areas of first waiting spaces and second waiting spaces can be changed.

In still another embodiment, if the parking facility 210 has a plurality of areas partitioned by fixed type or movable gates, the fence control unit 620 may control a gate installed in each area. For example, the parking facility 210 has a plurality of floors, and for each floor, a gate for restricting entrance of vehicles to the floor is installed. The fence control unit 620 may control each gate by transmitting, to the gate, a condition for the gate to decide whether or not to allow entrance of vehicles.

In this case, each gate performs communication with a vehicle wishing to enter an area at which the gate is installed, and for example decides whether or not the vehicle is set to an automatic operation mode. If the above-mentioned vehicle is set to an automatic operation mode, the vehicle is allowed to enter. On the other hand, if the above-mentioned vehicle is not set to an automatic operation mode, the vehicle is prohibited from entering. Thereby, blocks included in an area where each gate is installed can be changed into a block for first waiting spaces along with the lapse of time. As a result, the areas of first waiting spaces and second waiting spaces can be changed.

The fence control unit 620 may determine a condition for the entrance managing unit 242 or each gate to decide whether or not to allow entrance of vehicles according to the purpose of entrance restriction. The fence control unit 620 may transmit the above-mentioned condition to the entrance managing unit 242 or each gate. Thereby, the entrance managing unit 242 or each gate can decide whether or not to allow entrance of vehicles according to the purpose of entrance restriction.

In the present embodiment, the brokering unit 630 brokers conclusion of a use contract of a parking space 212 outside the parking facility 210 with an administrator of the parking space 212 outside the parking facility 210. For example, if the block type determining unit 610 determines to increase the area of first waiting spaces or second waiting spaces, the brokering unit 630 refers to information stored in the brokering information storing unit 640, and extracts a space available as a first waiting space or second waiting space from parking spaces stored in the brokering information storing unit 640. The brokering unit 630 may extract a space that matches a condition about the period of use, cost of use, distance from the parking facility 210, traffic convenience or the like.

The brokering information storing unit 640 stores information to be used in a brokering process of the brokering unit 630. For example, for each space among a plurality of spaces available as parking spaces 212, the brokering information storing unit 640 stores, in association with each other, positional information about the space, and at least one of information related to a period during which the space can be used as a parking space 212 and information related to a usage fee.

Figure 7:
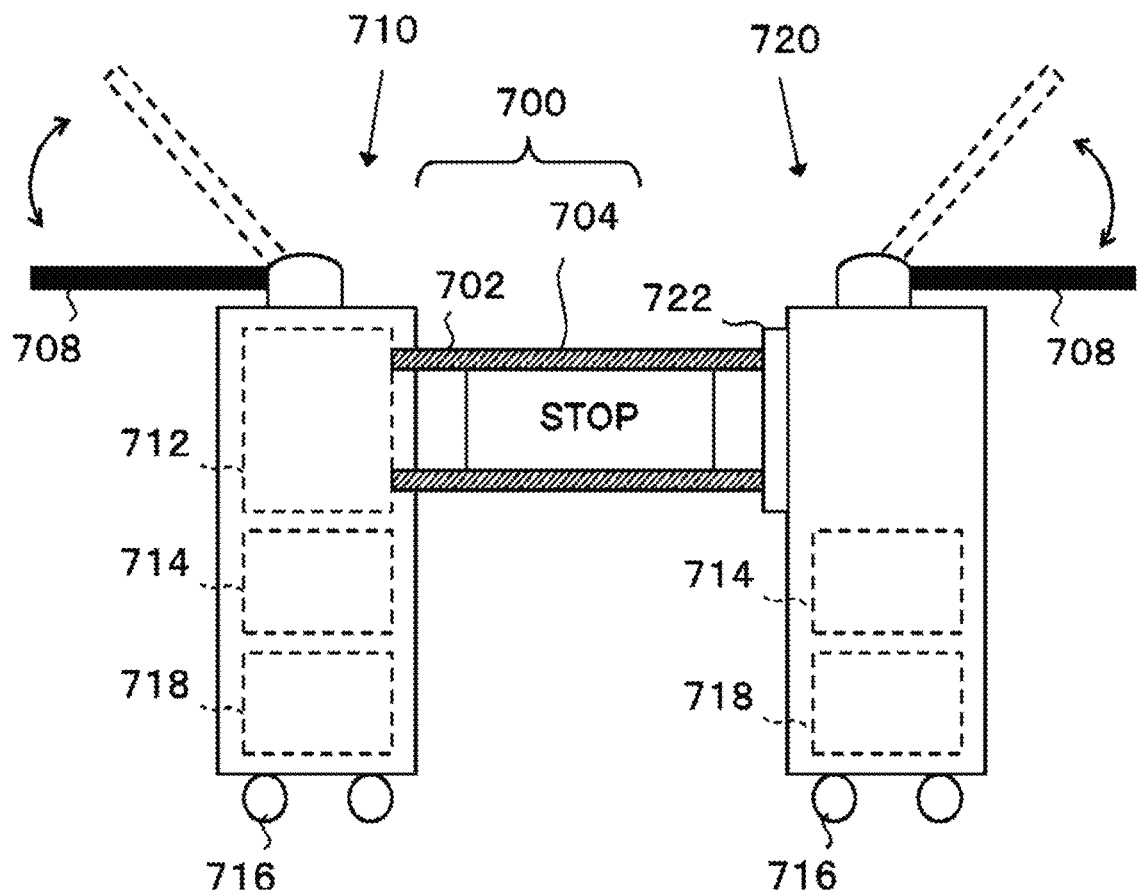
FIG. 7 schematically shows one example of the internal configuration of a movable fence 250.

FIG. 7 schematically shows one example of the internal configuration of the movable fence 250. The movable fence 250 for example is installed inside the parking facility 210, and restricts entrance of vehicles not having an automatic operation function or vehicles not running in an automatic operation mode into a parking space for vehicles having automatic operation functions or vehicles running in an automatic operation mode.

In the present embodiment, the movable fence 250 includes a fence 700, and a fence placement device 710 and a fence placement device 720 that hold the fence 700 and move it to a given position by an automatic operation. In the present embodiment, the fence 700 has a wire 702 and a banner 704. A message to a driver of a vehicle may be described in the banner 704. The fence 700 may be one example of a movable partitioning member. The fence 700 may be one example of a fence portion. The movable fence 250 may be one example of a fence portion. The gate bar 708 may be one example of a gate portion. The fence placement device 710 and the fence placement device 720 may be one example of a gate portion.

In the present embodiment, the fence placement device 710 includes: gate bars 708 for allowing or prohibiting entrance of vehicles; a fence winding unit 712 for winding and containing the fence 700; control units 714 that control operation of the fence placement device 710; tires 716; and drive units 718 that drive the tires to move the fence placement device 710.

The control unit 714 may have a communication device, and receive a control signal from the fence control unit 620. The control unit 714 may control at least one of the fence winding units 712 and the drive units 718 based on the control signal. Thereby, for example, the movable fence 250 can move to a position indicated by the control signal received from the fence control unit 620 by an automatic operation, and install a physical partition by using the fence 700.

In one embodiment, the control unit 714 receives, from a vehicle 202 having an automatic operation function, an identification signal indicating that the vehicle is set to an automatic operation mode. If having received the identification signal, the control unit 714 controls lifting and lowering of a gate bar 708 to allow entrance of the above-mentioned vehicle 202. Thereby, the vehicle set to an automatic operation mode can enter a parking space for vehicles having automatic operation functions or vehicles running in an automatic operation mode (which is for example the above-mentioned first waiting space).

In the present embodiment, the fence placement device 720 includes the gate bars 708, control units 714, tires 716 and drive units 718. The fence winding unit 712 may include a fence holding unit 722 to hold the fence 700.

In the present embodiment explained, a message to a driver of a vehicle is described on the banner 704. However, the method of outputting a message to a driver of a vehicle is not limited to the present embodiment. In another embodiment, at least one of the fence placement device 710 and the fence placement device 720 may have a display device or audio output device, and the display device or audio output device may output a message to a driver of a vehicle.

In the present embodiment explained, the fence placement device 710 and the fence placement device 720 run to move in the parking facility 210. However, the fence placement device 710 and the fence placement device 720 are not limited to the present embodiment. In another embodiment, at least one of the fence placement device 710 and the fence placement device 720 may fly to move in the parking facility 210.

In still another embodiment, one of the fence placement device 710 and the fence placement device 720 may move in the parking facility 210 with the other one of them being mounted thereon. For example, the fence placement device 710 moves to a position indicated by a control signal received from the fence control unit 620 with the fence placement device 720 being mounted thereon. The fence placement device 710 may run to move in the parking facility 210 or may fly to move in the parking facility 210.

Upon arrival of the fence placement device 710 at a position, or near the position, indicated by a control signal received from the fence control unit 620, the fence placement device 720 may separate from the fence placement device 710, and move to a position different from the position of the fence placement device 710. Thereby, the fence 700 can be installed at a position indicated by a control signal received from the fence control unit 620.

In the present embodiment explained, the fence placement device 710 and the fence placement device 720 cooperate to install the fence 700. However, the method of installing the fence 700 is not limited to the present embodiment.

According to another embodiment, the fence 700 is installed using the fence placement device 710 and the fence holding unit 722. For example, the fence holding unit 722 is installed at one or more positions in the parking facility 210. The fence control unit 620 determines which fence holding unit 722 to use among one or more fence holding units 722 to unfold the fence 700 housed in the fence placement device 710. The fence control unit 620 transmits, to the fence placement device 710, a signal instructing installation of the fence 700 and a signal indicating an installation position of the fence 700.

The fence placement device 710 moves to the position indicated by the control signal received from the fence control unit 620, and fixes one end of the fence 700 to the fence holding unit 722 installed at the position. Thereafter, the fence placement device 710 moves in the parking facility 210 so that the fence 700 is installed at a predetermined position. Thereby, the fence 700 contained in the fence winding unit 712 can be unfolded at a given position.

Furthermore, according to still another embodiment, the fence 700 is installed using the fence placement device 720 and the fence winding unit 712. For example, the fence winding unit 712 containing the fence 700 is installed at one or more positions in the parking facility 210. The fence control unit 620 determines from which fence winding unit 712 among one or more fence winding units 712 a fence 700 contained therein is to be unfolded. The fence control unit 620 transmits, to the fence placement device 720, a signal instructing installation of the fence 700 and a signal indicating an installation position of the fence 700.

The fence placement device 720 moves to a position indicated by a control signal received from the fence control unit 620 and uses the fence holding unit 722, and holds one end of the fence 700 contained in the fence winding unit 712 installed at the position. Thereafter, the fence placement device 720 moves in the parking facility 210 so that the fence 700 is installed at a predetermined position. Thereby, the fence 700 contained in the fence winding unit 712 can be unfolded at a given position.

In the present embodiment explained, the fence placement device 710 and the fence placement device 720 have the gate bars 708. However, the fence placement device 710 and the fence placement device 720 are not limited to the present embodiment. In another embodiment, at least one of the fence placement device 710 and the fence placement device 720 may not have the gate bar 708. In this case, at least one of the fence placement device 710 and the fence placement device 720 may function as a gate by blocking a passage, opening a passage and so on. Each of the fence placement device 710 and the fence placement device 720 may function as a gate singly.

In still another embodiment, at least one of the fence placement device 710 and the fence placement device 720 may not have the fence 700 and the gate bar 708. The fence placement device 710 does not have to have the fence winding unit 712, and the fence placement device 720 may not have the fence holding unit 722. The fence placement device 710 and the fence placement device 720 may have a display device or audio output device that outputs a message to a driver of a vehicle.

In this case, each of the fence placement device 710 and the fence placement device 720 may function as a gate or a fence singly. For example, the fence placement device 710 or the fence placement device 720 functions as a gate by blocking a passage, opening a passage and so on. Also, the fence placement device 710 or the fence placement device 720 functions as a fence by stopping at an installation position of a fence, cruising at an installation position of a fence and so on. A plurality of the fence placement devices 710 or a plurality of the fence placement devices 720 may function as a gate or a fence.

Figure 8:
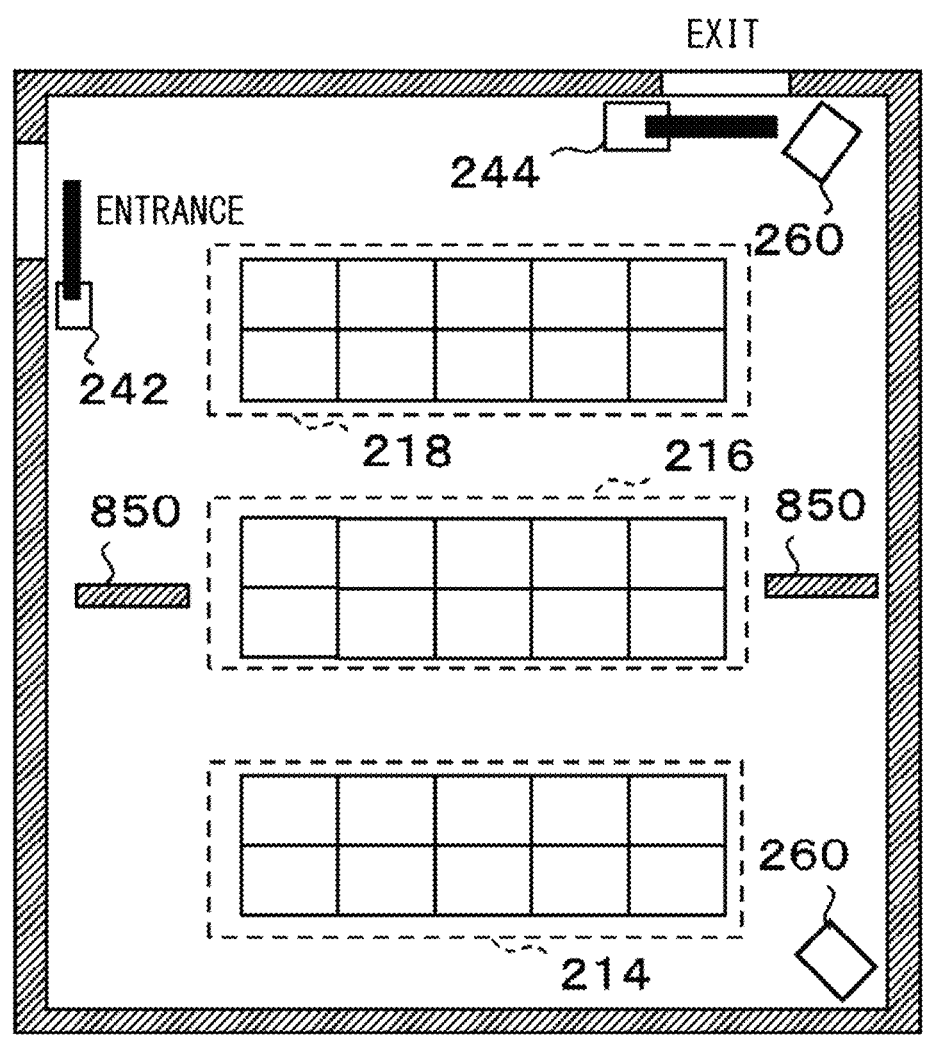
FIG. 8 schematically shows one example of a parking facility 810.

FIG. 8 schematically shows one example of a parking facility 810. In the present embodiment, the parking facility 810 is different from the parking facility 210 in that it has movable fences 850 instead of the movable fence 250. In other respects of the configuration, it may have similar features as those of the parking facility 210.

In the present embodiment, the movable fences 850 are installed on a ceiling, and restrict entrance of vehicles by lifting and lowering a banner on a passage. If a human is operating a vehicle, when the banner is lowered, it will not enter beyond the banner in many cases. On the other hand, if a vehicle is moving in an automatic operation mode, even if the banner is lowered, the vehicle can enter beyond the banner as long as safety is confirmed. Thereby, a partition position can be changed by an inexpensive method.

Figure 9:
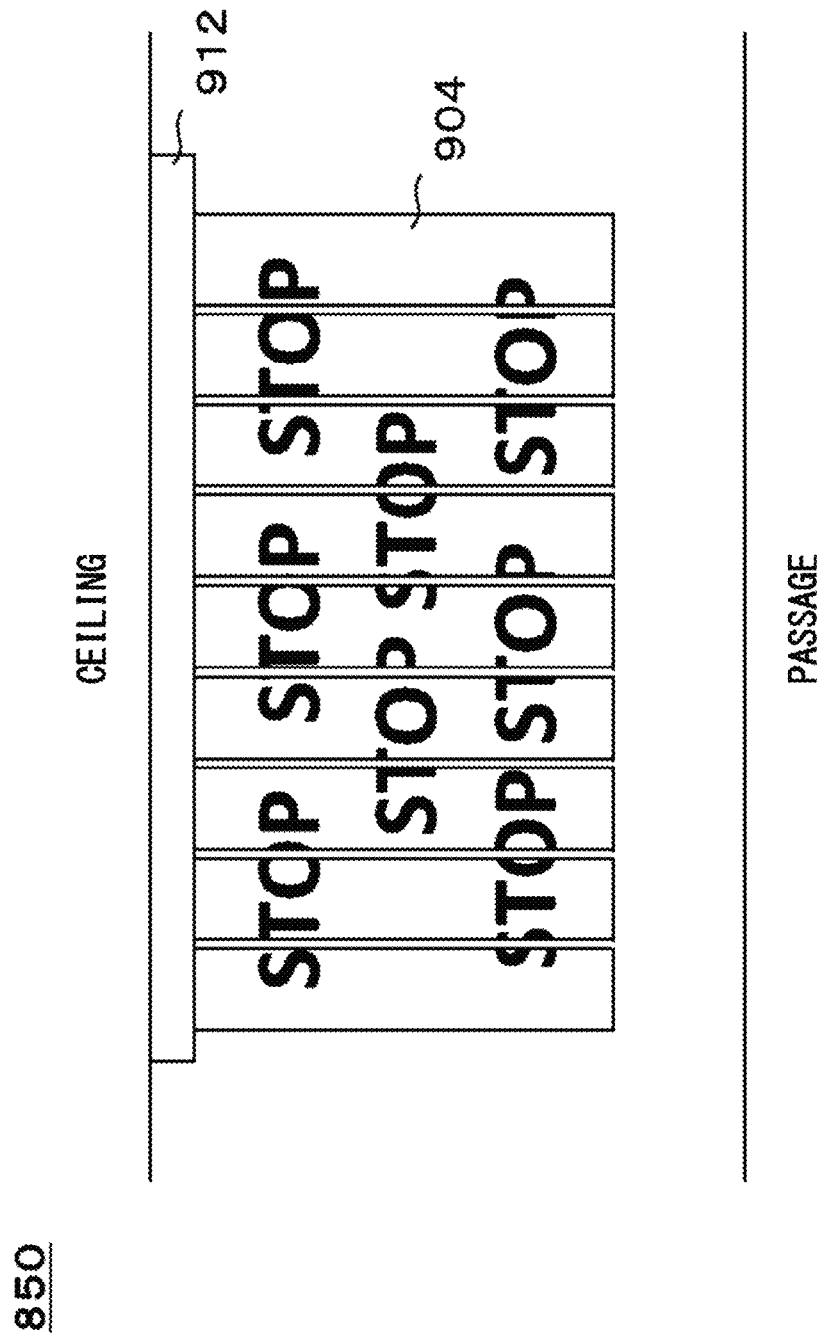
FIG. 9 schematically shows one example of the system configuration of a movable fence 850.

FIG. 9 schematically shows one example of the system configuration of the movable fences 850. In the present embodiment, the movable fence 850 includes a banner 904 and a fence winding unit 912. The banner 904 may be configured with a plurality of banners. A message to a driver of a vehicle may be described on the banners 904. The banners 904 may have a width that is approximately the same with the width of a passage part, or may have any length longer than the passage part.

In the present embodiment, the fence winding unit 912 is disposed on a ceiling, and lifts and lowers the banner 904. The fence winding unit 912 may have a winding device that winds the banners 904. The fence winding unit 912 may have a beacon transmitting device that transmits, by near-field wireless communication, a signal indicating that entrance is allowed if a vehicle is moving in an automatic operation mode.

In the present embodiment explained, the fence winding unit 912 is disposed on a ceiling. However, the movable fence 850 is not limited to the present embodiment. In another embodiment, the fence winding unit 912 may be disposed in a floor, and lift and lower a fence. The fence winding unit 912 may be embedded in a floor, and lift and lower a fence.

In the present embodiment explained, the fence is solid banners 904. However, the movable fence 850 is not limited to the present embodiment. In another embodiment, the fence may be liquid or aerosol. In this case, the movable fence 850 may include a fence generating device instead of the fence winding unit 912. The fence generating device may be a mist generating device that generates mist of water droplets. The movable fence 850 may have a projection device that cause a liquid or aerosol fence to display a message to a driver of a vehicle.

While the embodiments of the present invention have been described, the technical scope of the invention is not limited to the above described embodiments. It is apparent to persons skilled in the art that various alterations and improvements can be added to the above-described embodiments. Also, matters explained about a particular embodiment can be applied to another embodiment, unless such an application causes technical contradictions. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A charging system that charges a storage battery mounted on a movable body by supplying electric power thereto, the movable body being movable using electric power provided from the storage battery, wherein
the movable body has an automatic operation function,
the charging system comprises:
a movable body managing unit that manages a charging state of the storage battery of the movable body; and
a waiting space managing unit that manages a usage state of a plurality of waiting spaces for keeping the movable body waiting, and
the waiting space managing unit has:
a waiting space determining unit that determines, among the plurality of waiting spaces that the waiting space managing unit is managing, a waiting space for keeping the movable body waiting after charging of the movable body has completed, if the movable body managing unit has detected that: (i) charging of the movable body is being started; (ii) charging of the movable body has been started; (iii) charging of the movable body is completing; or (iv) charging of the movable body has completed; and a waiting instruction transmitting unit that transmits, to the movable body that has completed charging, a waiting instruction to move the movable body from a charging position to the waiting space determined by the waiting space determining unit, the waiting space managing unit:

manages the plurality of waiting spaces, classifying them into a first waiting space for a first movable body having the automatic operation function and a second waiting space for a second movable body not having the automatic operation function; and determines to change an area of at least one of the first waiting space and the second waiting space according to at least one of a usage status of the first waiting space and a usage status of the second waiting space.

2. The charging system according to claim 1, further comprising a fence portion including a movable partitioning member that partitions the first waiting space and the second waiting space, wherein based on the determination by the waiting space managing unit, the fence portion changes areas of the first waiting space and the second waiting space using the movable partitioning member.

3. The charging system according to claim 1, wherein the movable body managing unit receives, from the movable body that has received the waiting instruction, (i) a first signal indicating that movable body has completed movement to the waiting space indicated by the waiting instruction or (ii) a second signal indicating that the movable body cannot wait at the waiting space indicated by the waiting instruction, and the waiting space managing unit reserves a spare waiting space for the movable body until the movable body managing unit receives the first signal or the second signal.

4. The charging system according to claim 1, wherein each waiting space among the plurality of waiting spaces is a space for housing the movable body.

5. The charging system according to claim 1, further comprising an electric power supply unit that supplies electric power to the movable body, wherein the electric power supply unit:

(i) has a mechanism for supplying electric power to the movable body in a contactless manner.

6. The charging system according to claim 1, further comprising an electric power supply unit that supplies electric power to the movable body, wherein the electric power supply unit has a connection terminal for supplying electric power to the movable body in a contact manner and a mechanism for automatically moving the connection terminal.

7. The charging system according to claim 1, wherein the waiting space managing unit has a waiting space information storing unit that stores, for each waiting space among the plurality of waiting spaces and in association with each other, positional information of the waiting space and information related to a period during which the waiting space can be used, and the waiting space determining unit is configured and adapted to refer to information stored in the waiting space information storing unit and extract, from the plurality of waiting spaces, a waiting space for keeping the movable body that has completed charging waiting.

8. The charging system according to claim 1, wherein the waiting instruction is:

(i) an instruction to stop the movable body at a particular position after moving the movable body to the position;

(ii) an instruction to stop the movable body in a particular area after moving the movable body to a given position in the area; or (iii) an instruction to cause the movable body to cruise in a particular area after moving the movable body to a given position in the area.

9. A non-transitory computer readable medium storing thereon a program for causing a computer to function as a charging system by performing operations comprising:

managing, by a movable body managing unit, a charging state of a storage battery of a movable body; and managing, by a waiting space managing unit, a usage state of a plurality of waiting spaces for keeping the movable body waiting, wherein the managing of the usage state includes:

determining, by a waiting space determining unit, among the plurality of waiting spaces that the waiting space managing unit is managing, a waiting space for keeping the movable body waiting after charging of the movable body has completed, if the movable body managing unit has detected that: (i) charging of the movable body is being started; (ii) charging of the movable body has been started; (iii) charging of the movable body is completing; or (iv) charging of the movable body has completed;

transmitting, by a waiting instruction transmitting unit, to the movable body that has completed charging, a waiting instruction to move the movable body from a charging position to the waiting space determined by the waiting space determining unit;

managing the plurality of waiting spaces, classifying the plurality of waiting spaces into a first waiting space for a first movable body having an automatic operation function and a second waiting space for a second movable body not having the automatic operation function; and determining to change an area of at least one of the first waiting space and the second waiting space according to at least one of a usage status of the first waiting space and a usage status of the second waiting space.

10. A charging method of charging a storage battery mounted on a movable body by supplying electric power thereto, the movable body being movable using electric power provided from the storage battery, wherein the movable body has an automatic operation function, the charging method comprises:

managing a charging state of the storage battery of the movable body; and managing a usage state of a plurality of waiting spaces for keeping the movable body waiting, and the managing of the usage state has:

determining, among the plurality of waiting spaces being managed, a waiting space for keeping the movable body waiting after charging of the movable body has completed, if it has been detected in the managing of the charging state that: (i) charging of the movable body is being started; (ii) charging of the movable body has been started; (iii) charging of the movable body is completing; or (iv) charging of the movable body has completed; and transmitting, to the movable body that has completed charging, a waiting instruction to move the movable body from a charging position to the waiting space determined in the determining, the managing of the usage state includes:

managing the plurality of waiting spaces, classifying them into a first waiting space for a first movable body having the automatic operation function and a second waiting space for a second movable body not having the automatic operation function; and determining to change an area of at least one of the first waiting space and the second waiting space according to at least one of a usage status of the first waiting space and a usage status of the second waiting space.

11. The charging method according to claim 10, further comprising, based on the determination in the managing of the usage state, changing areas of the first waiting spaced and the second waiting space using a movable partitioning member that partitions the first waiting space and the second waiting space.

12. The charging method according to claim 10, wherein each waiting space among the plurality of waiting spaces is a space for housing the movable body.

* * * * *